US009619864B2

(12) United States Patent
Chen et al.

(10) Patent No.: US 9,619,864 B2
(45) Date of Patent: Apr. 11, 2017

(54) IMAGE PROCESSING APPARATUS AND METHOD FOR INCREASING SHARPNESS OF IMAGES

(71) Applicant: Realtek Semiconductor Corporation, Hsinchu (TW)

(72) Inventors: Cheng-Yueh Chen, Taichung (TW); Chun-Hsing Hsieh, Hsinchu (TW); Jun-Yu Yang, Changhua County (TW); Zhi-Gang Sun, Mengcun County (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 14/840,032

(22) Filed: Aug. 30, 2015

(65) Prior Publication Data

US 2016/0284056 A1    Sep. 29, 2016

(30) Foreign Application Priority Data

Mar. 25, 2015 (CN) .......................... 2015 1 0133092

(51) Int. Cl.
*G06K 9/36* (2006.01)
*G06T 3/40* (2006.01)
*G06T 5/00* (2006.01)

(52) U.S. Cl.
CPC ............ *G06T 3/4061* (2013.01); *G06T 5/003* (2013.01)

(58) Field of Classification Search
None
See application file for complete search history.

(56) References Cited

U.S. PATENT DOCUMENTS 6,285,798 B1 * 9/2001 Lee .................... G06T 5/004
                                                382/260
6,611,627 B1 * 8/2003 LaRossa ................ G06T 5/10
                                                382/240

(Continued)

FOREIGN PATENT DOCUMENTS

CN      1917577 A      2/2007
TW    201001334 A      1/2010

OTHER PUBLICATIONS

Sung Cheol Park et al., "Super-resolution image reconstruction: a technical overview," IEEE Signal Processing Magazine, vol. 20, Issue 3, pp. 21-36, ISSN 1053-5888, May 2003.

(Continued)

*Primary Examiner* — Andrae S Allison
(74) *Attorney, Agent, or Firm* — CKC & Partners Co., Ltd.

(57) ABSTRACT

An image processing apparatus includes a high-frequency component translating unit, a high-frequency component extracting unit, a detail-gain generating unit and an image output unit. The high-frequency component translating unit extracts and translates first high-frequency components of an input image to generate a first image. The high-frequency component extracting unit extracts second high-frequency components to generate a second image. The detail-gain generating unit stores a conversion table and generates detail gains respectively associated with input pixels in the input image according to pixel values of the input pixels and the conversion table. The image output unit calculates a weighted superposition of the first image and the second image and generates a high frequency component of an output image according to the weighted superposition and the detail gains.

20 Claims, 7 Drawing Sheets

(56) References Cited

U.S. PATENT DOCUMENTS

| | | | | |
|---|---|---|---|---|
| 6,714,688 | B1* | 3/2004 | Gallagher | G06T 5/004 382/260 |
| 6,735,330 | B1* | 5/2004 | Van Metter | G06T 5/008 382/132 |
| 6,909,813 | B2* | 6/2005 | Amano | G06T 7/0083 358/3.26 |
| 6,965,406 | B1* | 11/2005 | Ueda | H04N 5/208 348/235 |
| 7,130,483 | B2* | 10/2006 | Kim | G06T 5/004 382/132 |
| 7,881,549 | B2* | 2/2011 | Yamashita | G06T 5/004 348/622 |
| 9,123,140 | B1* | 9/2015 | Liu | G06T 3/4053 |
| 2002/0067862 | A1* | 6/2002 | Kim | G06T 5/004 382/266 |
| 2009/0232401 | A1* | 9/2009 | Yamashita | G06T 5/004 382/199 |

OTHER PUBLICATIONS

William T. Freeman, et al., "Example-based super-resolution," Mitsubishi Electric Research Laboratories,TR2001-30, Aug. 2001.
Hong Chang, et al., "Super-resolution through neighbor embedding," Computer Vision and Pattern Recognition, 2004. CVPR 2004. Proceedings of the 2004 IEEE Computer Society Conference on (vol. 1), Jun. 27, 2004-Jul. 2, 2004.
Jianchao Yang, "Image Super-Resolution Via Sparse Representation," University of Illinois at Urbana-Champaign, Jun. 22, 2010.

* cited by examiner

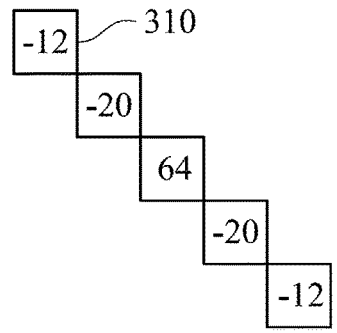
Fig. 3A
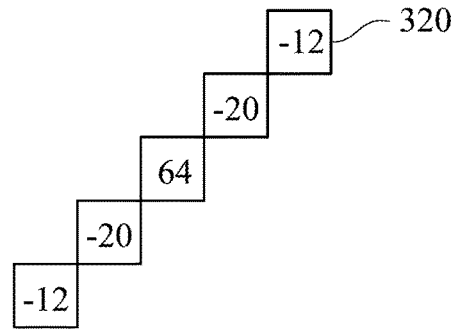
Fig. 3B
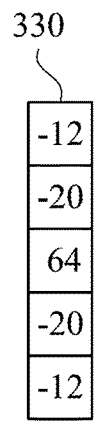
Fig. 3C
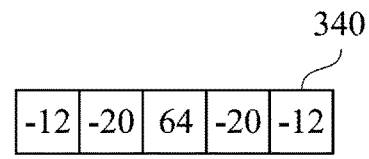
Fig. 3D
| -12 | -12 | -12 | -12 | -12 |
|-----|-----|-----|-----|-----|
| -12 | -20 | -20 | -20 | -12 |
| -12 | -20 | 352 | -20 | -12 |
| -12 | -20 | -20 | -20 | -12 |
| -12 | -12 | -12 | -12 | -12 |
Fig. 3E

|    |    |   |    |   |    |    |
|----|----|---|----|---|----|----|
| -12| -20| 0 | 64 | 0 | -20| -12|

370C

|    |    |   |   |    |   |   |    |    |
|----|----|---|---|----|---|---|----|----|
| -12| -20| 0 | 0 | 64 | 0 | 0 | -20| -12|

| -12 |
|-----|
| -20 |
| 0   |
| 64  |
| 0   |
| -20 |
| -12 |

370F

| -12 |
|-----|
| -20 |
| 0   |
| 0   |
| 64  |
| 0   |
| 0   |
| -20 |
| -12 |

Fig. 5D  Fig. 5E

IMAGE PROCESSING APPARATUS AND METHOD FOR INCREASING SHARPNESS OF IMAGES

RELATED APPLICATIONS

This application claims priority to Chinese Application Serial Number 201510133092.5, filed Mar. 25, 2015, which is herein incorporated by reference.

BACKGROUND

Technical Field

The present disclosure relates to an image processing apparatus and method. More particularly, the present disclosure relates to an image processing apparatus and a method for increasing sharpness of images.

Description of Related Art

With restrictions posed by the transmission rate and storage capacity, videos and images are often transmitted or stored in low-resolution formats. Image interpolation is frequently used to increase the resolution of the videos and images, such that they can be displayed on high-resolution display devices. However, although the number of pixels is increased with image interpolation techniques, the generated images and videos are often blurry and of low image quality. Super resolution (SR) technology is proposed to add details to the blurry images, and there are various techniques to realize super resolution.

The first technique is to construct a single frame of high-resolution image using multiple frames of low-resolution images. The low-resolution images taken during a short time segment cover the same scene, and thus include different details of the scene. This technique extracts details from the low-resolution images taken at approximately the same time and combines the details to form a high-resolution image. However, this technique consumes significantly more memory space than the memory space needed for the low-resolution images.

Another technique is generating high-resolution images using a learning-based algorithm. This technique generates high-resolution images by comparing features of image blocks in a low-resolution image with data stored in a high-resolution image database, and replacing the image blocks of the low-resolution image with high-resolution image blocks which match the features from the high-resolution image database. However, this technique requires large memory space for the high-resolution image database and is computationally intensive when searching the high-resolution image database with the features of the image blocks.

SUMMARY

An aspect of the present disclosure is directed to an image processing apparatus including a high-frequency component translating unit, a high-frequency component extracting unit, a detail-gain generating unit, and an image output unit. The high-frequency component translating unit extracts and translates first high-frequency components of an input image to generate a first image. The high-frequency component extracting unit extracts second high-frequency components to generate a second image. The detail-gain generating unit stores a conversion table and generate detail gains respectively associated with input pixels in the input image according to pixel values of the input pixels and the conversion table. The image output unit calculates a weighted superposition of the first image and the second image and generate a high frequency component of an output image according to the weighted superposition and the detail gains.

Another aspect of the present disclosure is directed to an image processing method including the following operations: extracting and translating multiple first high-frequency components to generate a first image; extracting multiple second high-frequency components to generate a second image; generating detail gains respectively associated with input pixels in the input image according to pixel values of the input pixels and a conversion table; and calculating a weighted superposition of the first image and the second image and generating a high-frequency component of an output image according to the detail gains and the weighted superposition.

It is to be understood that both the foregoing general description and the following detailed description are by example, and are intended to provide further explanation of the disclosure as claimed.

BRIEF DESCRIPTION OF THE DRAWINGS

The disclosure can be more fully understood by reading the following detailed description of the embodiment with the accompanying drawings as follows:

FIGS. 3A-3E are schematic diagrams of masks with coefficients associated with digital image filters;

FIGS. 5B-5E are schematic diagrams of masks associated with high-pass filters.

DETAILED DESCRIPTION

Figure 1:
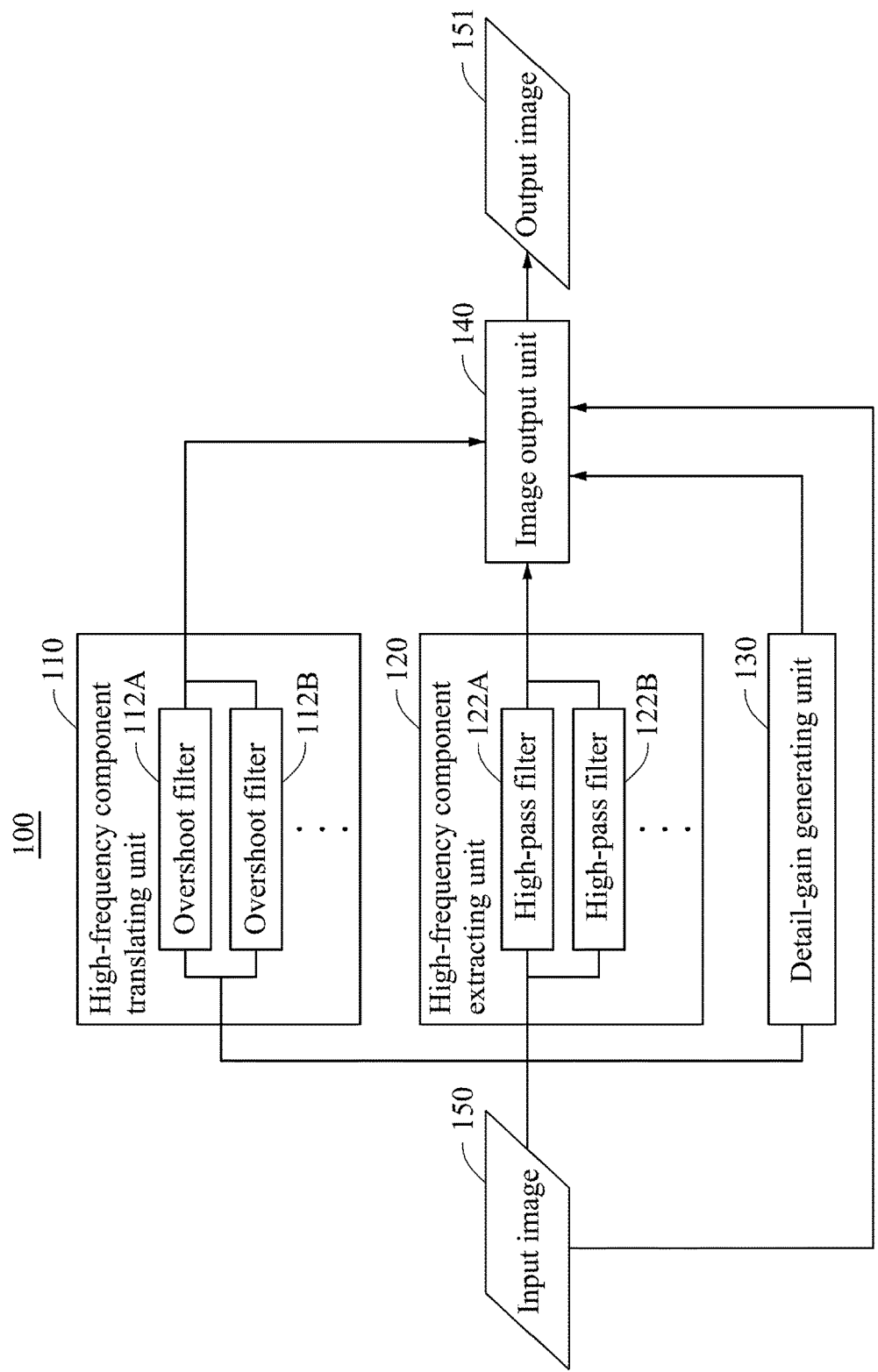
FIG. 1 is a schematic block diagram of an image processing apparatus according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

When human beings perceive digital images, contrast is a key factor to perceptual image quality. Due to the characteristics of the human visual system (HVS), images with high contrast enable viewers to observe more details of the images. Moreover, high-contrast images (particularly high-frequency components in the high-contrast images) often leave viewers the impression of sharpness due to psychophysical effect, and therefore perceptual image quality of these images is higher than that of low-contrast images. Research and experiments have proven that moderate amounts of random noise of high frequency actually improves perceptual image quality. However, purely random noise or excessive noise deteriorates perceptual image quality.

Therefore, the present disclosure provides an image processing apparatus 100 for processing an input image 150 to generate an output image 151, and the hardware components are shown in FIG. 1. FIG. 1 is a schematic block diagram of an image processing apparatus 100 according to an embodiment of the present disclosure. In FIG. 1, parallelogrammic blocks represent input/output data, and rectangular blocks represent hardware components. The input image 150 is a high-resolution image generated by interpolating a low-resolution image to increase the number of pixels. However, the image interpolation technique is only used to generate the input image 150 as a smooth digital image without adding details to the input image 150. Therefore, the input image 150 is still blurry for its lack of details. The image processing apparatus 100 is configured to process the input image 150 to add details to the output image 151 and improve the image quality of the output image 151. The components in the image processing apparatus 100 are described with details below.

It is worth noting that when the input image 150 is a color image, its pixel value can be represented with intensity values of red, green, and blue channels (RGB), or intensity values of hue, saturation, and value channels (HSV). There are other systems to denote pixel values, and the present disclosure is not limited herein. When the input image is a grayscale image, pixel values are expressed in grayscale intensity value. For clarity and ease of understanding, pixel values are expressed as grayscale intensity values in the following descriptions. Those skilled in the art may apply the present disclosure to color images with pixels value expressed in different systems, and thus the present disclosure is not limited to grayscale images.

The image processing apparatus 100 includes a high-frequency component translating unit 110, a high-frequency component extracting unit 120, a detail-gain generating unit 130, and an image output unit 140. The high-frequency component translating unit 110 is configured for extracting and translating first high-frequency components of the input image 150 to generate a first image. The high-frequency component extracting unit 120 is configured for extracting second high-frequency components to generate a second image. The detail-gain generating unit 130 is configured for storing a conversion table and generating detail gains respectively associated with input pixels in the input image 150 according to pixel values of the input pixels and the conversion table. The image output unit 140 is configured for calculating a weighted superposition of the first image and the second image and generating a high frequency component of the output image 151 according to the weighted superposition and the detail gains.

The detail-gain generating unit 130 is configured to generate the detail gains according to the pixel values of the input pixels of the input image 150 and include randomness with the conversion table when generating the detail gains. Furthermore, the image output unit 140 is configured to calculate the weighted superposition (or weighted sum) of the translated first high-frequency components and the untranslated second high-frequency components to generate the high-frequency component of the output image 151. In some embodiments, the image output unit 140 is configured to directly blend the high-frequency component in the input image 150 to generate the output image 150, and the output image 150 is richer in details and higher in contrast than the input image 150. Illustratively, blending the first image generated by the high-frequency component translating unit 110 enriches details in the output image 151, and the maximum frequency of the output image 151 becomes higher than that of the input image 150 by blending the first image and the second image according to the detail gains including randomness. Further details of the detail-gain generating unit 130 are given below.

Figure 2A:
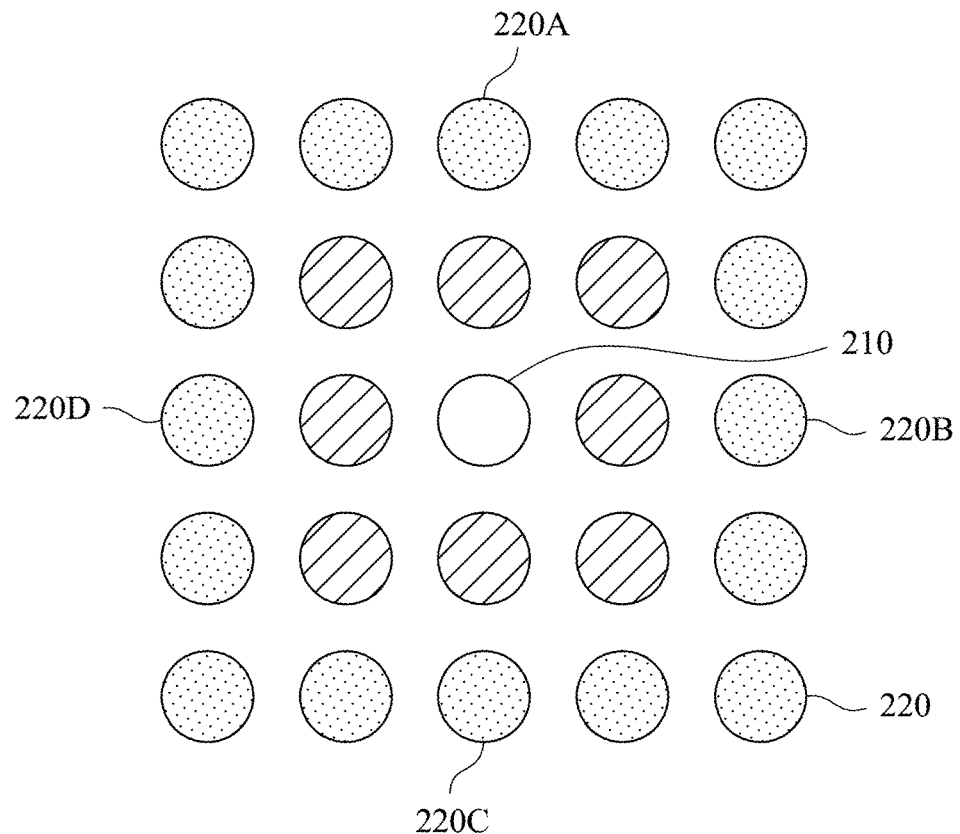
FIG. 2A is a schematic diagram of neighboring pixels illustrated according to an embodiment of the present disclosure.

FIG. 2A is a schematic diagram of neighboring pixels illustrated according to an embodiment of the present disclosure. A first input pixel 210 shown in FIG. 2A is one of the input pixels of the input image 150. The detail-gain generating unit 130 is configured to extract multiple neighboring pixels separate from the first input pixel 210 by at least one pixel, e.g., the input pixel 220 and those input pixels marked with the same pattern as the input pixel 220 as shown in FIG. 2A. The detail-gain generating unit 130 is configured to select multiple pixels from the input pixels marked with the same pattern as the pixel 220 to be the neighboring pixels, and to search the conversion table with a pixel value sum of the first input pixel 210 and the neighboring pixels, in which the pixel value sum corresponds to the first input pixel 210. In more details, the detail-gain generating unit 130 is configured to search the conversion table with the pixel value sum as an input value, and to output a corresponding output value as the detail gain associated with the first input pixel 210 according to the input value and the conversion table.

When the detail-gain generating unit 130 selects the neighboring pixels associated with the first input pixel 210, the input pixels separate from the first input pixel 210 by at least one pixel are selected, i.e., the input pixels marked with the same pattern as the input pixel 220. Accordingly, the neighboring pixels associated with the first input pixel 210 do not overlap with the neighboring pixels associated with other input pixels immediately next to the first input pixel 210, and hence greater difference exist between the pixel value sums respectively associated with two input pixels immediately next to each other. Illustratively, greater difference is created for the detail gains associated with two input pixels immediately next to each other. As a result, image contrast is enhanced when the detail gains are applied. Moreover, since the detail gains are utilized for blending the first high-frequency components and the second high-frequency components of the input image 150, the output image 151 is correlated to the input image 150. Specifically, the details included in the output image 151, i.e., the first image and the second image weighted with the detail gains, therefore remain consistent with the input image 150, which makes image enhancement natural to viewers.

In one embodiment, the detail-gain generating unit 130 is configured to extract pixels separate from the first input pixel 210 by one pixel from up, down, left, and right directions with respect to the first input pixel 210 as the neighboring pixels 220A-220D. In other embodiments, the detail-gain generating unit 130 is configured to extract pixels separate from the first input pixel 210 by one pixel from up, down, left, right, and diagonal directions (eight directions in total) as the neighboring pixels, and the pixel value sum of the eight neighboring pixels and the first input pixel 210 is used to generate the detail gain associated with the first input pixel 210. Those skilled in the art can select the neighboring pixels appropriate for the application scenarios, and the present disclosure is not limited herein.

Figure 2B:
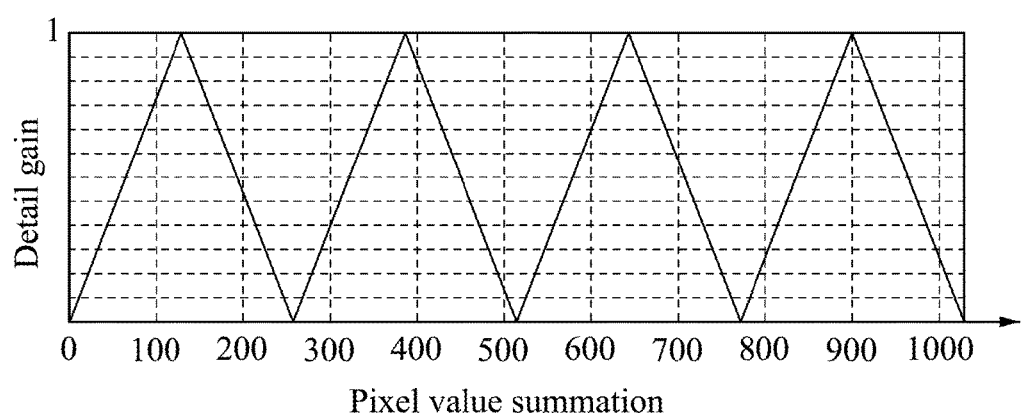
FIG. 2B is a schematic diagram of a function associated with a conversion table illustrated according to an embodiment of the present disclosure.

In another embodiment, the conversion table stored in the detail-gain generating unit 130 corresponds to a periodic continuous function as shown in FIG. 2B. The periodicity of the periodic continuous function enables the input pixels in bright areas (i.e., input pixels with high pixel value) and the input pixels in dark areas (i.e., input pixels with low pixel value) of the input image 150 to have approximately equal opportunity to be associated with the detail gains with higher values (or lower values), and therefore the generation process of the detail gains entail randomness. Furthermore, when the image processing apparatus 100 is used to process images from streaming media or videos, two consecutive input images 150 usually include areas capturing the same scene or object, and the pixel values of the areas including the same scene or object in these two input images 150 are not identical due to noise. Also, the continuity of the periodic continuous function enables a smooth variation of the detail gains associated with the input pixels in the input images temporarily next to each other and having different pixel value due to noise. Therefore, the areas including the same scene or object in two consecutive output images 151 look stable, and quality of the output images 151 are resistant to noise. The periodic continuous function shown in FIG. 2B is a function with repeating triangle wave. In other embodiments, the periodic continuous function can be repeating semicircle wave. Those skilled in the art can use other functions having periodicity and continuity, and the present disclosure is not limited herein.

In one embodiment, input values of the conversion table correspond to the detail gains with a value range from 0 to N. In some embodiments, the value range of the detail gains is from 0 to N, and the detail gains can be any rational number between 0 and N. In other embodiments, the value range of the detail gains is from 0 to 127, and detail gains can be any integer between 0 and 127 to facilitate digital arithmetic operation of the pixel value. Those skilled in the art can determine the value of N and number format appropriate for the application scenarios, and the present disclosure is not limited herein.

Before proceeding to the details of the high-frequency component translating unit 110 and high-frequency component extracting unit 120, a brief introduction for digital image filters is given with FIGS. 3A-3E. FIGS. 3A-3E are schematic diagrams of masks and their coefficients associated with digital image filters. The digital image filters are configured for filtering digital images according to their spatial frequency. Orientation, width, and coefficients of masks associated with digital image filters are adjustable according to application scenarios. FIGS. 3A-3D illustrate masks corresponding to one-dimensional 5-tap filters with their width equal to 5 pixels. Particularly, FIGS. 3A-3B illustrate masks 310-320 corresponding to diagonal 5-tap filters, FIG. 3C illustrates a mask 330 corresponding to a vertical 5-tap filter, and FIG. 3D illustrates a mask 340 corresponding to a horizontal 5-tap filter. In some applications, digital image filters correspond to two-dimensional masks, e.g., a mask 350 shown in FIG. 3E. Coefficient values of the masks corresponding to digital image filters are designed according to their applications. For example, the masks 310-350 have positive coefficient values at the centers and negative coefficient values for the other parts of the masks because the masks 310-350 correspond to high-pass filters. On the other hand, the masks have all positive coefficient values with their sum equal to 1 when the masks correspond to low-pass filters. The width of a mask is adjustable according to application scenarios, and the present disclosure is not limited herein.

After digital images are processed with high-pass filters, high-frequency components of the digital images are extracted. High-frequency components correspond to areas in which pixel values vary frequently or considerably, e.g., areas containing edges or textured areas. The high-frequency component translating unit 110 and the high-frequency component extracting unit 120 of the image processing apparatus 100 are configured to process the high-frequency components contained in the input image 150.

In one embodiment, the high-frequency component translating unit 110 includes two overshoot high-pass filters 112A-112B connected in parallel and configured to filter the input image 150 to generate two high-frequency translation images, and each of the high-frequency translation images includes a first high-frequency component. The high-frequency component translating unit 110 is configured to generate the first image by selecting pixels with highest absolute pixel values from the high-frequency translation images. In some embodiments, overshoot high-pass filters are also called overshoot filters.

Figure 4:
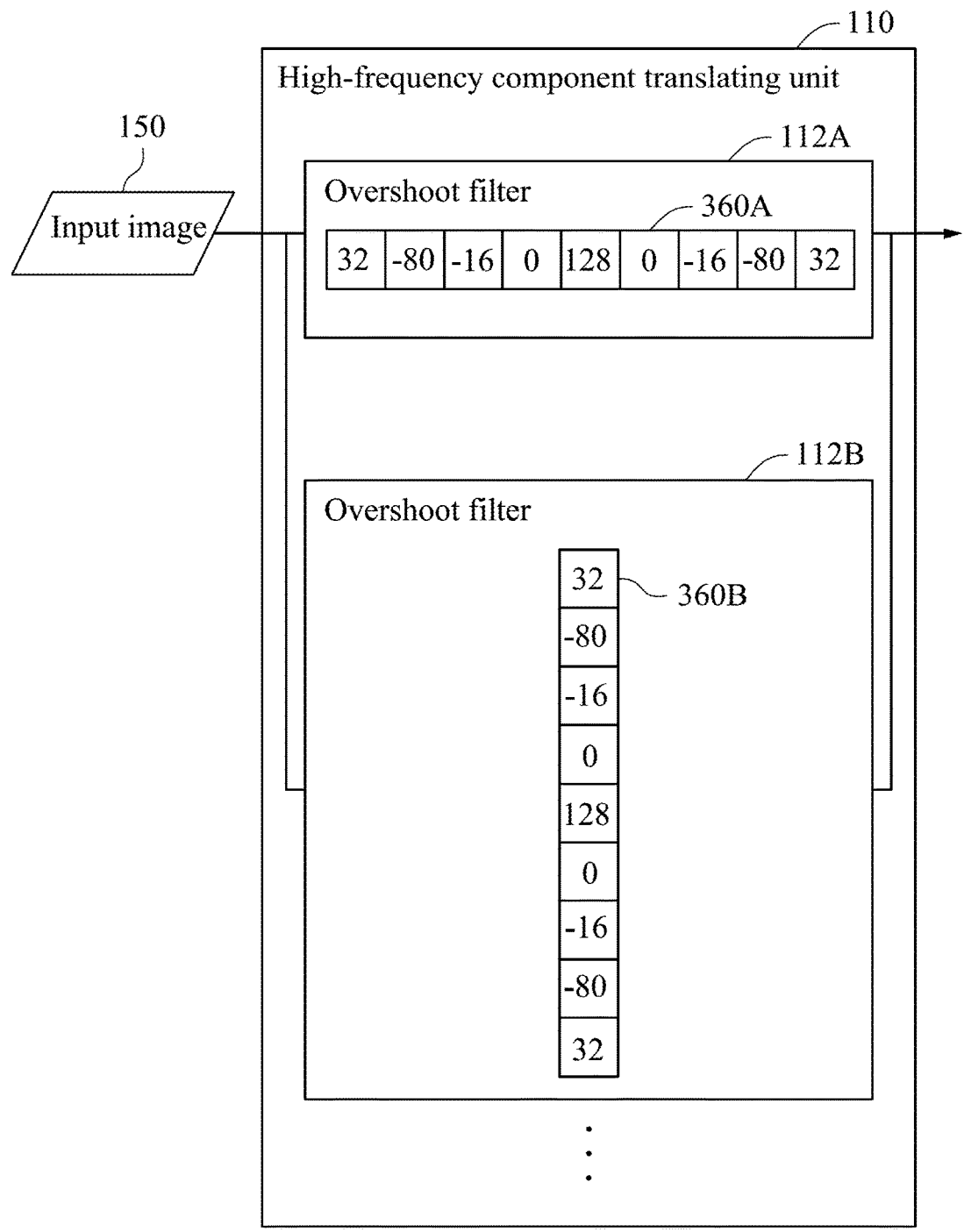
FIG. 4 is a schematic block diagram of a high-frequency translating unit according to an embodiment of the present disclosure.

For the embodiment shown in FIG. 4, the overshoot high-pass filters 112A-112B included in the high-frequency translating component 110 are corresponding to the overshoot high-pass filter mask 360A and the overshoot high-pass filter mask 360B respectively. The coefficient values at the center and periphery of the overshoot high-pass filter masks 360A-360B are positive, while the rest of the coefficient values are negative. The signs of the coefficient values of the overshoot high-pass filter masks 360A-360B are different from those of the masks corresponding to high-pass filters. Therefore, the first high-frequency components extracted from the input image 150 by the overshoot high-pass filters 112A-112B are translated due to overshooting effect. In other words, pixels with higher pixel values in the high-frequency translation images generated by the overshoot high-pass filters 112A-112B are associated with edges and textured areas in the input image 150 with translation. After the high-frequency translating unit 110 extracts the first image from the high-frequency translation images, the image output unit 140 is configured to blend the first image into the input image 150 to generate the output image 151 so as to enrich details in the output image 151. In the present embodiment, only one coefficient on the left/right periphery of the overshoot high-pass filter mask 360A/360B is assigned with a positive value. In other embodiments, positive values can be assigned to more than one coefficient on the left/right periphery of the masks, e.g., at least two coefficients.

In the present embodiment, the orientations of the overshoot high-pass filter masks 360A-360B are horizontal and vertical respectively, and the overshoot high-pass filters 112A-112B are utilized to extract and translate the first high-frequency components along horizontal and vertical directions to generate two high-frequency translation images accordingly. The high-frequency component translating unit 110 is configured to generate the first image having pixels with pixel values equal to the highest absolute pixel value (where largest variation of pixel value occurs) of the horizontal and vertical high-frequency translation images, and the first image therefore contain the first high-frequency components along different directions in the input image 150.

In other embodiments, the high-frequency component translating unit 110 includes more than three overshoot high-pass filters corresponding to masks having different orientation, width, and coefficient values, and the masks have positive coefficient values at their centers and peripheries and negative coefficient values for the rest. Those skilled in the art can adjust the number of the overshoot high-pass filters and design their corresponding masks according to application scenarios, and the present disclosure is not limited hereto.

Figure 5A:
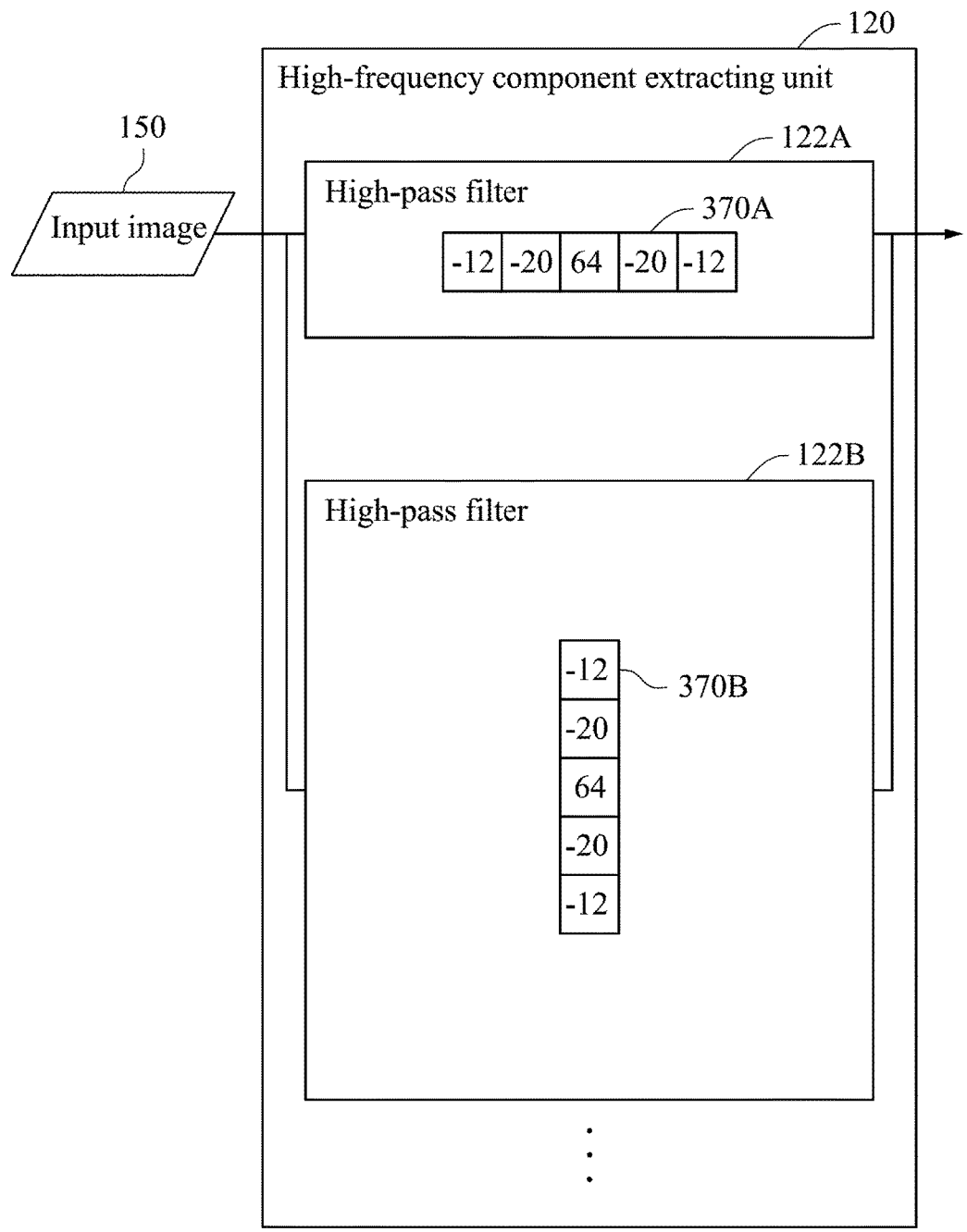
FIG. 5A is a schematic block diagram of a high-frequency extracting unit according to an embodiment of the present disclosure.

In one embodiment, as shown in FIG. 5A, the high-frequency component extracting unit 120 includes two high-pass filters 122A-122B connected in parallel and configured to filter the input image to generate two high-frequency images, and the high-pass filters 122A-122B correspond to two different masks 370A-370B respectively. The high-frequency images include the second high-frequency components respectively, and the high-frequency component extracting unit 120 is configured to generate the second image by selecting pixels with the highest absolute pixel values from the high-frequency images.

In other embodiments, the high-frequency component extracting unit 120 includes 4 high-pass filters respectively corresponding to high-pass filter masks 370C-370F shown in FIGS. 5B-5E respectively. Each of the high-pass filter masks 370C-370F has a positive coefficient value at its center and negative or zero coefficient values for the rest. The number of the high-pass filters included in the high-frequency component extracting unit 120 and the orientation, width, and coefficient values of masks corresponding to the high-pass filters are only by example. Those skilled in the art can modify the design according to application scenarios, and the present disclosure is not limited herein.

In one embodiment, the image output unit 140 includes at least one weighted adder and at least one multiplier. The weighted adder is configured to calculate the weighted superposition of the first image and the second image, and the weighted superposition is also called a weighted sum of the first image and the second image. The multiplier in the image output unit 140 is configured to multiply the weighted superposition of the first image and the second image by the detail gains, and the multiplication result from the multiplier is used as the high-frequency component of the output image 151. In some embodiments, the weighed adder can be replaced with an adder, and the weights of the first image and the second image are both equal to 1. The adder is configured to calculate the weighted sum of the first image and the second image, and the weighted sum is further multiplied by the detail gains to be the high-frequency component of the output image 151. In some embodiments, the image output unit 140 further includes another adder to add the high-frequency component of the output image 151 to the input image 150 to generate the output image 151. Those skilled in the art can implement the image output unit 140 with other types of hardware or circuitry components, and the present disclosure is not limited hereto.

The image processing apparatus 100 generates the high-resolution output image 151 with one single low-resolution input image 150 at low hardware manufacturing cost and low computational budget. Moreover, the sharpness of the input image 150 is increased and rich details are added to the input image 150. Furthermore, the image processing apparatus 100 is particularly effective for textured areas in the input image 150.

Figure 6:
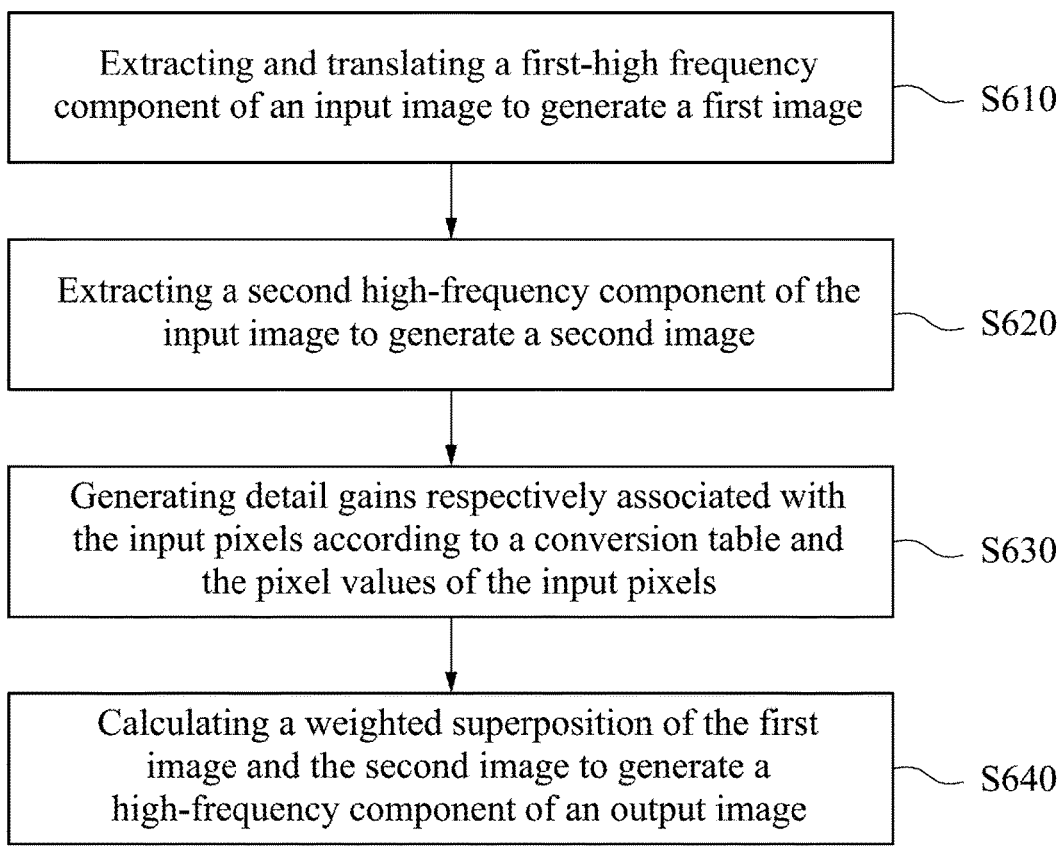
FIG. 6 is a flow chart of an image processing method according to one embodiment of the present disclosure.

FIG. 6 is a flow chart of an image processing method according to one embodiment of the present disclosure. It is worth noting that while the process flow of the image processing method 600 described below includes a number of operations that appear to be in a specific order, it should be apparent that these operations may include more or fewer operations, which may be executed serially or in parallel (e.g., using parallel processors or in a multi-threading environment). Furthermore, the descriptions for the image processing method 600 take the image processing system 100 by example for clarity and ease of understanding, but the present disclosure is not limited hereto.

During the operation flow of the image processing method 600, the image processing apparatus 100 is configured for extracting and translating first high-frequency components from an input image to generate a first image (S610). The first image includes the translated first high-frequency components of the input image and is used to add details to the output image. In one embodiment, the image processing apparatus 100 is configured to filter the input image with at least two overshoot high-pass filters to generate multiple high-frequency translation images. Pixels with high absolute pixel values in the high-frequency translation images respectively correspond to the first high-frequency components in the input image 150, i.e., edges and areas where pixel values vary frequently in the input image 150. The image processing apparatus 100 selects the pixels with the highest absolute pixel values from the high-frequency translation images to form a first image. The overshoot high-pass filters correspond to different masks respectively, and the coefficient values are positive at the centers and the peripheries of the masks and negative for the other parts of the masks. Details of the overshoot high-pass filters and their corresponding masks are given in the above-described embodiments, and therefore not repeated herein.

The image processing apparatus 100 is configured for extracting a plurality of second high-frequency components from the input image to generate a second image (S620). The second image includes the second high-frequency components of the input image, and is used to enhance image sharpness. In one embodiment, the image processing apparatus 100 is configured to filter the input image with at least two high-pass filters corresponding to different masks. Multiple high-frequency images respectively including the second high-frequency components are generated, and the image processing apparatus 100 is configured to select pixels with the highest absolute pixel values from the high-frequency images. Details of the high-pass filters and their corresponding masks are given in the above-described embodiments, and therefore not repeated herein.

The image processing apparatus 100 is configured for generating multiple detail gains respectively associated with input pixels included in the input image according to pixel values of the input pixels and a conversion table (S630). The conversion table describes a mapping relationship of input values and output values, and the image processing apparatus 100 determines the input value with a pixel value sum of the input pixels, searches the conversion table with the input value, and uses the output value corresponding to the input value as one of the detail gains.

In one embodiment, the input pixels of the input image include a first input pixel. The image processing apparatus 100 is configured for extracting multiple neighboring pixels separate from the first input pixel by at least one pixel and searching the conversion table with the pixel value sum of the first input pixel and the neighboring pixels to generate one of the detail gains associated with the first input pixel. In another embodiment, the image processing apparatus 100 is configured for extracting pixels separate from the first input pixel by one pixel from up, down, left, and right directions with respect to the first input pixel as the neighboring pixels. Details of the operation of extracting the neighboring pixels are given in the afore-described embodiments, and not repeated herein.

The conversion table is used to map the pixel value sum of the first input pixel and the neighboring pixels to one of the detail gains. In one embodiment, the conversion table corresponds to a periodic continuous function. In another embodiment, the detail gains recorded in the conversion table fall in a value range from 0 to N. Details of the conversion table are given in the afore-described embodiments, and not repeated herein.

The image processing apparatus 100 is configured for calculating a weighted superposition of the first image and the second image and generating a high-frequency component of an output image according to the detail gains and the weighted superposition (S640). In some embodiments of the operation S640, the image processing apparatus 100 is configured for blending the weighted superposition into the input image to generate the output image. The weighted superposition is also called a weighted sum of the first image and the second image. In some embodiments, the image processing apparatus 100 calculates the weighted superposition with equal weights for the first image and the second image. The weights associated with the first image and the second image are adjustable according to application scenarios, and the present disclosure is not limited herein.

The output image includes the input image, the first image including the first high-frequency components in the input image after translation, and the second image including the second high-frequency components. Therefore, the output image is richer in details and higher in contrast than the input image. Furthermore, detail gains are used to add new high-frequency components to the output image, and the new high-frequency components are of higher spatial frequency than the highest spatial frequency of the input image. The increase of spatial frequency in the output image also improves perceptual image quality.

In conclusion, the present disclosure provides an image processing apparatus and an image processing method to increase resolution and improve perceptual image quality of an output image without high hardware cost and computational resource. Single input image is utilized to obtain an output image with high resolution and rich details. When multiple images in a video file are used as input images, the resulted output images displayed to the viewers are stable, and thus leading to a better viewer experience.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image processing apparatus, comprising:
at least one processor connected to a memory, wherein the at least one processor is configured to:
extract and translate a plurality of first high-frequency components of an input image to generate a first image;
extract a plurality of second high-frequency components of the input image to generate a second image;
generate a plurality of detail gains respectively associated with a plurality of input pixels in the input image according to a conversion table and pixel values of the input pixels, wherein the detail gain of a first input pixel of the input pixels is corresponding to a pixel value sum of pixel values of the first input pixel and a plurality of neighboring pixels separate from the first input pixel by at least one pixel; and
calculate a weighted superposition of the first image and the second image and to generate a high-frequency component of an output image according to the detail gains and the weighted superposition.

2. The image processing apparatus of claim 1, wherein the at least one processor is configured to blend the high-frequency component of the output image into the input image to generate the output image.

3. The image processing apparatus of claim 1, wherein the at least one processor is configured to extract the plurality of neighboring pixels separate from the first input pixel by at least one pixel and to search the conversion table with a pixel value sum of the first input pixel and the neighboring pixels to generate the detail gain associated with the first input pixel, wherein the first input pixel is one of the input pixels.

4. The image processing apparatus of claim 3, wherein the at least one processor is configured to extract pixels separate from the first input pixel by one pixel from up, down, left, and right directions as the neighboring pixels.

5. The image processing apparatus of claim 1, wherein the conversion table corresponds to a periodic continuous function.

6. The image processing apparatus of claim 1, wherein a value range of the detail gains is from 0 to N.

7. The image processing apparatus of claim 1, wherein the at least one processor is configured to filter the input image to generate a plurality of high-frequency translation images with at least two overshoot high-pass filters, and the at least one processor is configured to generate the first image by selecting pixels with highest absolute pixel values from the high-frequency translation images, and the high-frequency translation images comprise the first high-frequency components, respectively.

8. The image processing apparatus of claim 7, wherein the overshoot high-pass filters are associated with a plurality of masks respectively, and coefficient values at the center and periphery of the masks are positive while the rest of the coefficient values of the masks are negative.

9. The image processing apparatus of claim 1, wherein the at least one processor is configured to filter the input image to generate a plurality of high-frequency images with at least two high-pass filters and is configured to generate the second image by selecting pixels with highest absolute pixel values from the high-frequency images, and the high-frequency images comprise the second high-frequency components, respectively.

10. An image processing method, comprising:
extracting and translating a plurality of first high-frequency components from an input image to generate a first image;
extracting a plurality of second high-frequency components from the input image to generate a second image;
generating a plurality of detail gains respectively associated with a plurality of input pixels in the input image according to pixel values of the input pixels and a conversion table, wherein the detail gain of a first input pixel of the input pixels is corresponding to a pixel value sum of pixel values of the first input pixel and a plurality of neighboring pixels separate from the first input pixel by at least one pixel; and
calculating a weighted superposition of the first image and the second image and generating a high-frequency component of an output image according to the detail gains and the weighted superposition.

11. The image processing method of claim 10, further comprising:
blending the high-frequency component of the output image into the input image to generate the output image.

12. The image processing method of claim 10, wherein the operation of generating the detail gains comprises:
extracting the plurality of neighboring pixels; and
searching the conversion table with the pixel value sum to generate the detail gain associated with the first input pixel, wherein the first input pixel is one of the input pixels.

13. The image processing method of claim 12, wherein the operation of generating the detail gains comprises:
extracting pixels separate from the first input pixel by one pixel from up, down, left, and right directions as the neighboring pixels.

14. The image processing method of claim 10, wherein the conversion table corresponds to a periodic continuous function.

15. The image processing method of claim 10, wherein a value range of the detail gains is from 0 to N.

16. The image processing method of claim 10, wherein the operation of generating the first image comprises:
filtering the input image to generate a plurality of high-frequency translation images with at least two overshoot high-pass filters, and generating the first image by selecting pixels with highest absolute pixel values from the high-frequency translation images, wherein the high-frequency translation images comprise the first high-frequency components, respectively.

17. The image processing method of claim 16, wherein the overshoot high-pass filters are associated with a plurality of masks respectively, and coefficient values at the center and periphery of the masks are positive while the rest of the coefficient values of the masks are negative.

18. The image processing method of claim 10, wherein the operation of generating the second image comprises:
filtering the input image to generate a plurality of high-frequency images with at least two high-pass filters, and generating the second image by selecting pixels with highest absolute pixel values from the high-frequency images, wherein the high-frequency images comprise the second high-frequency components, respectively.

19. An image processing method, comprising:
extracting and translating a plurality of first high-frequency components from an input image to generate a first image;
extracting a plurality of second high-frequency components from the input image to generate a second image;
generating a plurality of detail gains respectively associated with a plurality of input pixels in the input image according to pixel values of the input pixels and a conversion table; and
calculating a weighted superposition of the first image and the second image and generating a high-frequency component of an output image according to the detail gains and the weighted superposition;
wherein the operation of generating the first image comprises:
filtering the input image to generate a plurality of high-frequency translation images with at least two overshoot high-pass filters, and generating the first image by selecting pixels with highest absolute pixel values from the high-frequency translation images, wherein the high-frequency translation images comprise the first high-frequency components, respectively.

20. The image processing method of claim 19, wherein the overshoot high-pass filters are associated with a plurality of masks respectively, and coefficient values at the center and periphery of the masks are positive while the rest of the coefficient values of the masks are negative.

* * * * *